(12) United States Patent
Scheit et al.

(10) Patent No.: US 9,840,203 B2
(45) Date of Patent: Dec. 12, 2017

(54) STORAGE SYSTEM FOR A VEHICLE

(71) Applicant: Volkswagen Aktiengesellschaft, Wolfsburg (DE)

(72) Inventors: Steffen Scheit, Gifhorn (DE); Bernd Abelmann, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/221,810

(22) Filed: Jul. 28, 2016

(65) Prior Publication Data
US 2017/0028926 A1 Feb. 2, 2017

(30) Foreign Application Priority Data
Jul. 28, 2015 (DE) .......... 10 2015 214 220

(51) Int. Cl.
*B60R 7/04* (2006.01)
*B60N 2/46* (2006.01)

(52) U.S. Cl.
CPC .............. *B60R 7/04* (2013.01); *B60N 2/4686* (2013.01)

(58) Field of Classification Search
CPC .......... B60R 7/04; B60R 7/043; B60R 7/046; B60R 7/06; B60R 2/4686; B60N 2/4686
USPC ............. 296/37.1, 24.34, 37.8, 37.12, 37.13, 296/37.15, 37.6
See application file for complete search history.

(56) References Cited

U.S. PATENT DOCUMENTS

| | | | | |
|---|---|---|---|---|
| 2,861,857 A | * | 11/1958 | Lee | A47B 83/045 312/312 |
| 4,809,897 A | | 3/1989 | Wright, Jr. | |
| 5,280,848 A | | 1/1994 | Moore | |
| 5,297,709 A | * | 3/1994 | Dykstra | B60N 3/102 224/281 |
| 5,301,992 A | * | 4/1994 | Whitmore | B60R 5/04 224/542 |
| 5,845,888 A | * | 12/1998 | Anderson | B60N 2/468 224/926 |
| 5,853,220 A | | 12/1998 | Gulich et al. | |
| 6,000,572 A | | 12/1999 | Kako et al. | |
| 6,003,927 A | * | 12/1999 | Korber | B60N 2/464 296/37.8 |
| 6,386,409 B1 | | 5/2002 | Cheney | |
| 6,435,633 B2 | * | 8/2002 | Hoshi | A47B 73/00 312/242 |
| 6,439,525 B1 | * | 8/2002 | Gehring | B60N 2/4686 224/926 |
| 6,467,830 B1 | * | 10/2002 | Cortright | B60R 13/06 296/26.04 |
| 6,866,319 B2 | | 3/2005 | Hupfer | |

(Continued)

FOREIGN PATENT DOCUMENTS

DE  101 39 867 A1  3/2003
DE  20 2004 001 804 U1  6/2004

(Continued)

*Primary Examiner* — Dennis H Pedder
(74) *Attorney, Agent, or Firm* — Muncy, Geissler, Olds & Lowe, P.C.

(57) ABSTRACT

A storage system for a vehicle, including housing, which at least partially surrounds a storage compartment, and at least one storage tray at least partially disposed in the storage compartment. The storage tray is designed to be able to slide with respect to the housing.

14 Claims, 2 Drawing Sheets

(56) References Cited

U.S. PATENT DOCUMENTS

| | | | | |
|---|---|---|---|---|
| 7,575,263 B2* | 8/2009 | Downey | ............ | B60R 7/04 224/539 |
| 7,802,833 B2* | 9/2010 | Boreanaz | ............ | B60N 3/102 296/24.34 |
| 7,828,171 B2* | 11/2010 | Ogura | ............ | B60N 3/102 220/262 |
| 7,891,623 B2* | 2/2011 | Haddad | ............ | B60N 3/102 224/926 |
| 8,191,847 B2* | 6/2012 | Mclaughlin | ............ | B60N 3/101 220/551 |
| 8,322,672 B2* | 12/2012 | Mclaughlin | ............ | B60N 3/101 220/551 |
| 9,156,412 B1* | 10/2015 | Calvert | ............ | B60P 7/08 |
| 9,481,403 B1* | 11/2016 | Johnson | ............ | B62D 33/023 |
| 2004/0217615 A1* | 11/2004 | Lindstrom | ............ | B60N 2/4686 296/24.34 |
| 2006/0278790 A1* | 12/2006 | Park | ............ | B60N 3/10 248/311.2 |
| 2008/0290125 A1* | 11/2008 | Lee | ............ | B60N 3/101 224/483 |
| 2013/0038097 A1* | 2/2013 | Oldani | ............ | B60N 3/105 297/188.14 |
| 2013/0118089 A1* | 5/2013 | Schulz | ............ | B60R 7/00 49/423 |
| 2014/0197657 A1* | 7/2014 | Gillis | ............ | B60N 3/101 296/37.8 |

FOREIGN PATENT DOCUMENTS

| | | | | |
|---|---|---|---|---|
| EP | 0 842 821 A2 | | 5/1998 | |
| EP | 0980790 A2 | * | 2/2000 | ............ B60N 3/001 |
| EP | 1 120 314 A2 | | 8/2001 | |
| EP | 2 567 868 A1 | | 3/2013 | |
| GB | 2 255 061 A | | 10/1992 | |
| GB | 2255061 B | * | 9/1994 | ............ B60N 3/102 |
| WO | WO 0021793 A1 | * | 4/2000 | ............ B60R 7/04 |

* cited by examiner

STORAGE SYSTEM FOR A VEHICLE

This nonprovisional application claims priority under 35 U.S.C. §119(a) to German Patent Application No. 10 2015 214 220.5, which was filed in Germany on Jul. 28, 2015, and which is herein incorporated by reference.

BACKGROUND OF THE INVENTION

Field of the Invention

The invention relates to a storage system for a vehicle.

Description of the Background Art

Storage systems for vehicles are known in various designs.

GB 2 255 061 A, which corresponds to U.S. Pat. No. 5,280,848, shows an interior part. This interior part is inserted into a center console of vehicles. The interior part has a cover, under which beverage holders are located. The beverage holders and the cover are each rotatably supported around a separate axis.

EP 1 120 314 A2 shows a container for vehicles. The container is used to receive objects, such as chip cards or magnetic stripe cards. Before the objects can be placed in the container by a person, a cover must be pivoted open. This cover is pivoted laterally past the housing of the container. The pivoting action moves a mechanism that extends a movable holding element.

DE 101 39 867 A1, which corresponds to U.S. Pat. No. 6,866,319, discloses a storage pocket in a vehicle. In the storage pocket, a storage shell may be pivoted around a hinge axis. The storage pocket may be closed with the aid of a cover.

SUMMARY OF THE INVENTION

It is therefore an of the invention to make better use of the space available in a storage pocket.

In an embodiment, a storage system for a vehicle is provided in that a storage tray is designed to be able to slide with respect to the housing. This results in the advantage that better use may be made of the volume of storage compartments.

In an exemplary embodiment of the invention, an unlocking device is present for locking and unlocking the storage tray with respect to the housing. An unlocking device is used to lock and unlock the storage tray with respect to the housing or with respect to the storage compartment. The unlocking device has the advantage that it holds the storage tray in at least one locking position with respect to the housing or with respect to the storage compartment. In this locking position, objects may be comfortably and safely placed in the storage tray or removed therefrom.

In an embodiment of the invention, a telescopic element is provided for the purpose of at least partially transporting the storage tray out of the storage compartment or out of the surrounding housing. Telescopic elements are use to transport the storage tray out of or into the storage compartment or the housing. If the storage tray of a storage system slides in the storage compartment with little friction, it may be comfortably transported out of the storage compartment or out of the housing at least partially surrounding the storage compartment mechanically or electrically by hand. Telescopic elements thus assist the user. Indeed, they also lift heaving objects out of the housing. The advantage is that even heavy objects may be stored in the storage compartment, since they are lifted out of the depths of the storage compartment without much application of force.

In an embodiment of the present invention, the telescopic element can include a rod guide. The storage tray should also be able to absorb high forces, since it is possible for the storage tray, which is at least partially extended out of the storage compartment, to be quickly and abruptly pushed back into the storage compartment or the housing while the car is being driven. The advantage of rod guides is their stability and reliability during low-friction sliding.

If the rod guide is formed from a carriage, in which two rods are guided, and a tension spring, the telescopic element has a particularly favorable, robust and straightforward design. This design therefore makes it easier for people to remove the storage tray themselves, if necessary. The advantage is that the storage tray may be easily removed, if necessary, for the purpose of cleaning.

An advantage of the aforementioned tension spring is that, in a suitable arrangement and configuration, the storage tray may be removed from the storage compartment or from the housing by the tension spring against the force of gravity. The tension spring is tensioned accordingly when the storage tray is pushed into the storage compartment. The storage tray may thereby automatically move out of the storage compartment or the surrounding housing. The advantage is that the storage tray is thus easily operated mechanically. In mechanisms of this type, a plurality of tension springs may also be advantageously installed. The advantage is that the total spring force may be variably set with the aid of the number of tension springs.

In an embodiment of the invention, a silicone brake can be provided for braking the velocity of the telescopic element. The telescopic element may thereby be comfortably inserted into the housing against the force of the tension spring. The silicone brakes the telescopic element during its movement. The advantage of a silicone brake is that the storage tray is removed comfortably, easily and gently from the storage compartment or from the housing. A person is not unpleasantly surprised by a storage tray shooting out of the storage compartment.

In an embodiment of the invention, the storage tray has at least two storage pockets. Due to a plurality of storage pockets, the user has the advantage of being able to differentiate the storage of objects, as desired. Two storage pockets are can be provided, disposed one above the other.

In an embodiment of the invention, the storage pockets furthermore have one or multiple, for example, removable storage shells. When the removable storage shells are inserted into the storage pockets, this has the advantage that the storage pockets are easier to clean, since the storage shells may be removed from the storage pockets for easy cleaning. The storage shells may have different structures and purposes, as desired. The storage pockets, and thus the storage tray, therefore have multifunctional uses.

In an embodiment of the invention, an armrest is provided for opening and closing the housing. The advantage is that, in a use position of the armrest, a person may comfortably rest their arm on the armrest. As a result, no more objects may unintentionally fall out of the storage compartment.

In an embodiment of the invention, the armrest is part of the aforementioned unlocking device. In many cases, armrests are already secured by a closing apparatus. Without the opening thereof, armrests are unable to be rotated or flipped up. If the armrest is part of the unlocking device of the storage tray, the storage tray can be automatically extended when the armrest is opened. The advantage is that a person must only release a safety lock in order to unlock the storage system. A rapid depositing of and search for objects is thus possible.

The armrest can be movable out of its use position, at least one of the storage pockets, in particularly the upper storage pocket, can be slidingly transported out of the storage compartment during this movement. In a storage system according to the invention, a plurality of storage pockets may be consecutively transported in a sliding manner in a continuous transport system. The plurality of storage pockets of the storage tray divides up the space of the storage compartment through which they pass. If a storage compartment of a vehicle is subdivided by a storage tray having a plurality of storage pockets, objects may be stored in different storage pockets. They are separated from each other thereby. The advantage of the separate storage, is that the principle of "toss it in, and you'll never find it again," the so-called pocketbook effect, is avoided. Deep and cluttered storage compartments in housings are efficiently made usable by the storage system. Indeed, searching through the depths of the storage compartment or the at least partially surrounding housing is dispensed with.

In an embodiment of the invention, a roller is provided for transferring the weight of the armrest and compressive forces. The roller transfers the weight of the armrest, and possibly a compressive force applied by a person, to the armrest to the storage tray.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
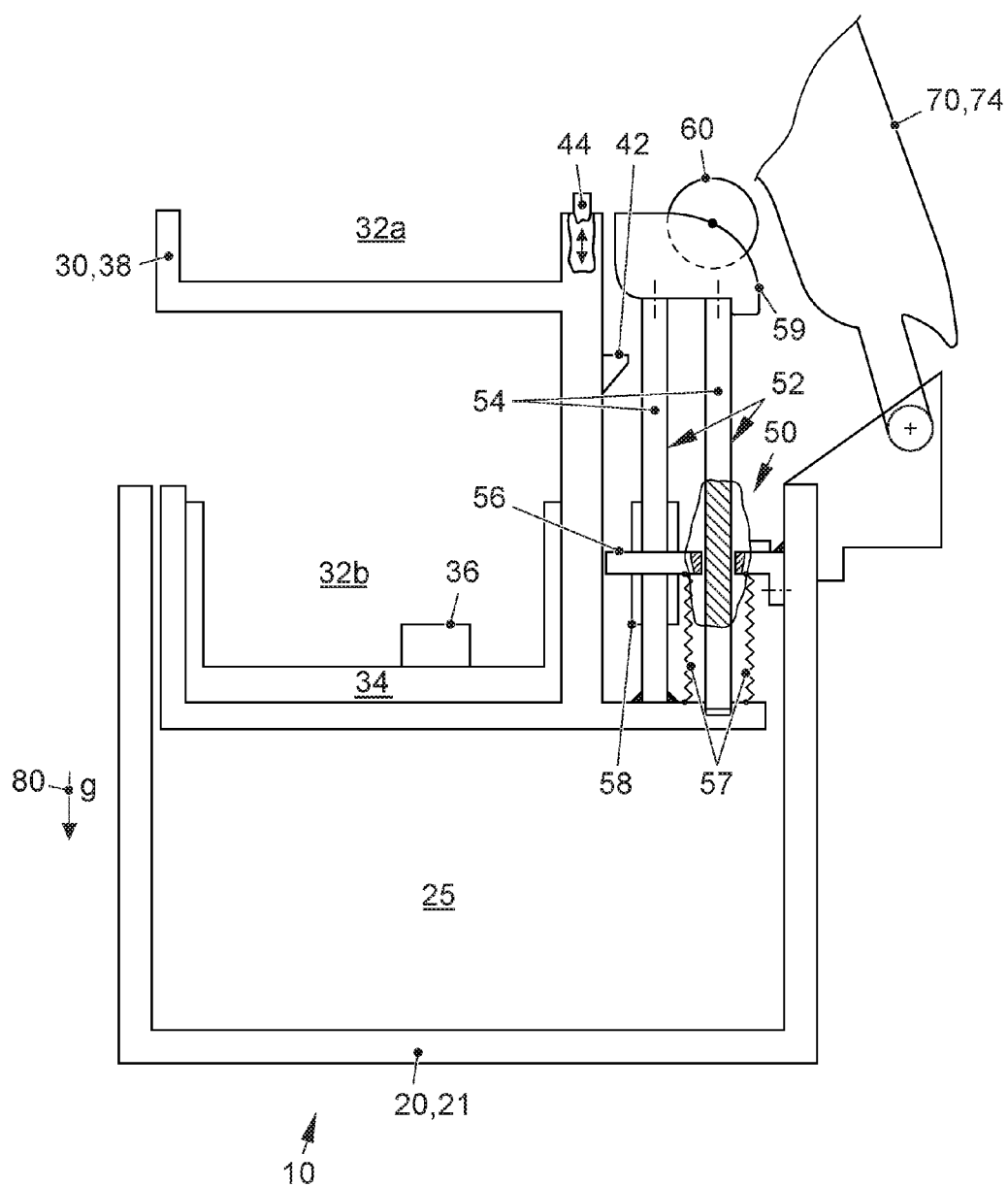
FIG. 1 shows a side view of one exemplary embodiment of a storage system according to the invention in an opened position of the housing and the storage compartment, including the storage tray in an access position.

FIG. 1 shows a side view of an exemplary embodiment of a storage system 10 according to the invention.

Storage system 10 may also be referred to as a paternoster system or paternoster storage tray. Its purpose is the efficient use of a limited storage compartment space. Storage system 10 is based on the principle of a paternoster elevator. Paternoster elevators have a plurality of elevator cabins, which move one after the other, i.e., serially, by a moving device. The special feature of these system is that they are moved by the moving device toward a removal opening or into a removal opening.

Storage system 10 according to the invention comprises a carrier 20 forming a housing 21, a storage compartment 25 surrounding housing 21, an armrest 70 closing storage compartment 25, a storage tray 30 slidingly disposed in storage compartment 25, an unlocking device 40 as well as a telescopic element 50 and a roller 60. Carrier 20 is a center console of a vehicle. A center console of this type is typically disposed between the two front seats of a vehicle for the purpose, among other things, of providing storage compartments 25.

In other exemplary embodiments, carrier 20, which forms a housing 21, may also be another component of an interior trim of motor vehicles, for example, door paneling, side paneling, floor paneling, instrument panels, roof liners or center armrests of bench seats.

In housing 21, storage tray 30 slides in storage compartment 25 with respect to housing 21. Storage tray 30 is a lifting tray. Storage tray 30 is constructed as a frame, in which recesses are formed in the form of two storage pockets 32a, 32b, so that the storage space of storage tray 30 is divided into two storage pockets 32a, 32b.

Alternatively, in other exemplary embodiments, the recesses may be openings, bores, indentations or embossed areas, which give a storage compartment a particular shape. The purpose of this shape may be tailored to particular objects or act as a general storage tray area.

A storage shell 34 is removably inserted in lower storage pocket 30 in FIG. 1. This makes it possible to store objects 36 either directly in storage pockets 32a, 32b or in storage shell 34. Storage shell 34 may have different regions, whose contours, shapes and haptics make it easier to stow ordinary objects 36.

In one exemplary embodiment, a storage shell 34 is divided, for example, into a pen holder, a coin holder and a compartment for mobile phones.

Unlocking device 40 comprises a hook 42, a pushbutton 44 and a mechanism. In an exemplary embodiment, hook 42 is part of storage tray 30. For this purpose, it is introduced into the back of storage tray 30 and connected to pushbutton 44 with the aid of mechanism 46. In this exemplary embodiment, this the mechanism includes a compression spring and an action, which transmits a press-in motion of pushbutton 44 into a retraction of hook 42 into the frame of storage tray 30. Telescopic element 50 is released by the retraction of hook 42.

Telescopic element 50 includes a rod guide 52. Rod guide 52 includes two rods 54, which run freely side-by-side or one after the other in a carriage 56. The movement results from the spring force of a tension spring 57. The movement is braked by a silicone brake 58, so that storage tray 30 slides out of housing 21 in storage compartment 25 gently and without jerking.

Alternatively, telescopic element 50 may also be a small hydraulic or pneumatic system, which may be controlled, for example electrically, via a control unit and an operating unit in the center console of the vehicle.

At the upper end of telescopic element 50, a cap 59 is screwed to each of the two rods 34. A groove is milled into cap 59. A roller 60 is supported therein with the aid of an axle. In an exemplary embodiment, roller 60 is made of soft rubber, so that it is able to roll effectively along the underside of armrest 70 disposed above it. Armrest 70 is supported, rotatable around an axis 72, on housing 21 or on its carrier 20.

In use, storage tray 30 may be comfortably used by a person for stowing objects 36. Two storage pockets 32a, 32b are available to the person via storage tray 30, an upper storage pocket 32a and a lower storage pocket 32b.

In an exemplary embodiment, upper storage pocket 32a is directly accessible, since storage system 10 does not have armrest 70 closing storage compartment 25. In this exemplary embodiment, storage system 10 may be readily unlocked by pressing pushbutton 44. The compressive force of a person upon pushbutton 44 is translated into an unlocking of unlocking device 50 with the aid of a mechanism 46.

In the exemplary embodiment illustrated in FIG. 1, mechanism 46 includes a spring, which presses hook 42 out of the frame of storage tray 30. Hook 42 thus engages beneath carriage 56, so that the free movement of rod guide 52 is hindered. Since rods 54 of rod guide 52 are glued, pressed or otherwise fastened to storage tray 30 by their lower end, storage tray 30 remains inserted in storage compartment 25 or in surrounding housing 21. Pressing pushbutton 44 causes hook 42 to be drawn into the frame of storage tray 30, so that rod guide 52 is able to move freely.

The forces of tension springs 57 are introduced into carriage 56 by hook 42. The advantage of a hook 42, which engages with carriage 56, is that unlocking device 40 is locked by hook 42 in the position at which forces are introduced. As a result, no torques occur, which wedge storage tray 30 in its inserted stowing position 39 and which interfere with or prevent it from traveling outward.

In the exemplary embodiment in FIG. 1, an armrest 70 is rotatably supported on housing 21. Armrest 70 may close storage compartment 25 and upper storage pocket 32a toward the top. In FIG. 1, however, armrest 70 is illustrated in a raised position 74, in which it provides access to storage compartment 25 in housing 21. Armrest 70 is secured against carrier 20 of housing 21 by a closure device, so that it is unable to flip up without a person opening the closure device. When armrest 70 is closed, armrest 70 presses against roller 60 by its weight 80. Roller 60 conducts this weight 80 to tension springs 57 via storage tray 30. Since weight 80 of armrest 70, together with the compressive force applied by a person, is greater than the tensile force of tension springs 57, storage tray 30 then moves into its stowing position 39 in storage compartment 25 in housing 21.

Storage system 10 has two end positions. FIG. 1 shows access position 38 for objects 36. In this access position 38, storage tray 30 is partially extended from storage compartment 25, namely relating to upper storage pocket 32a. Lower storage pocket 32b is raised into the opening area of storage compartment 25, so that an easy and independent access to both storage pockets 32a, 32b results in access position 38 in FIG. 1.

Figure 2:
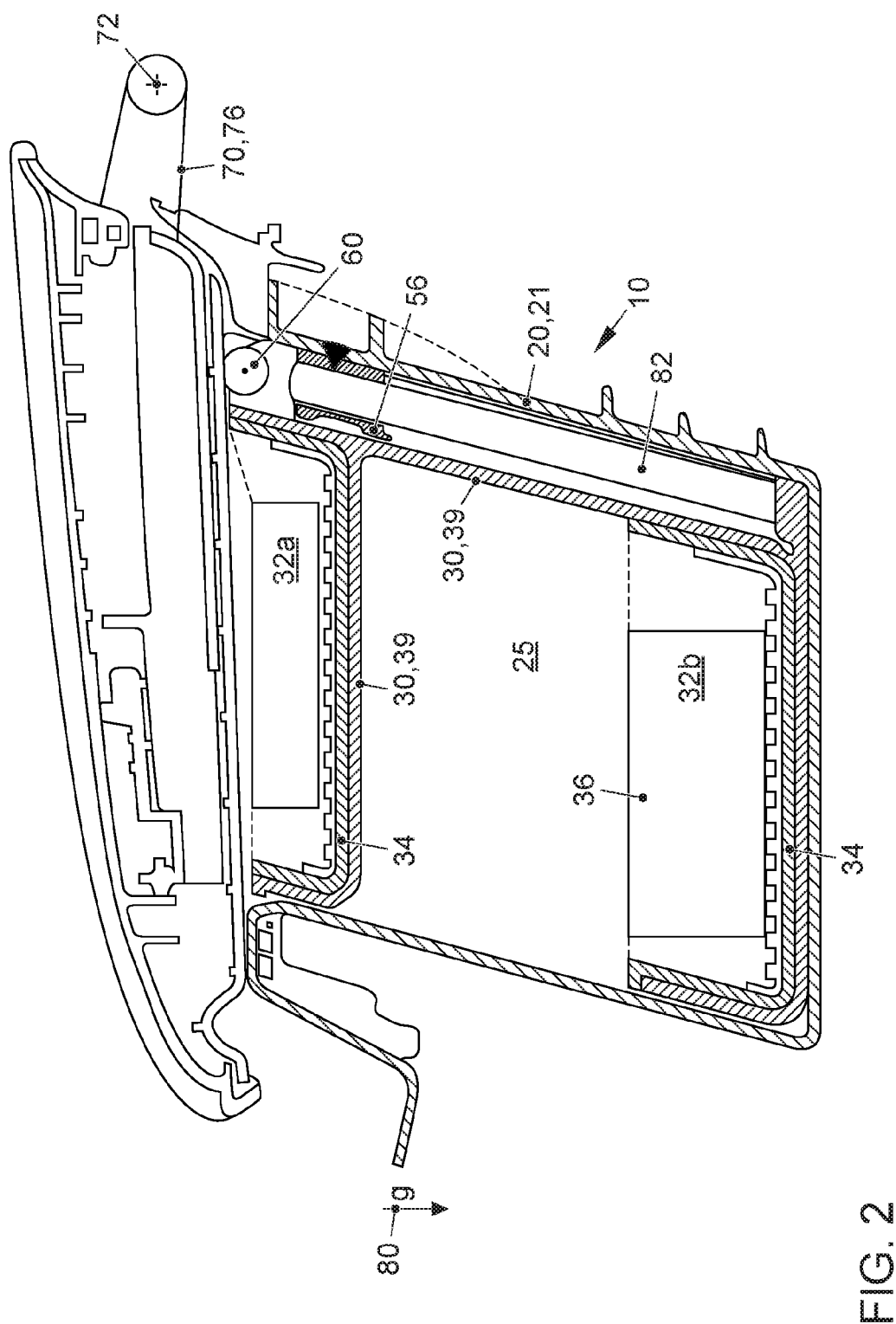
FIG. 2 shows a side view of another exemplary embodiment of a storage system according to the invention in a closed position of the housing and the storage compartment, including the storage tray in a stowed position.

FIG. 2 shows the second end position, stowing position 39. FIG. 2 shows a second exemplary embodiment, having a similar design, of a storage system 10 according to the invention in stowing position 39. In stowing position 39, i.e., when storage tray 30 is in storage compartment 25 in housing 21, hook 42 engages behind carriage 56, so that storage tray 30 remains inserted.

In the exemplary embodiment illustrated in FIG. 2, storage system 10 has an armrest 70. The latter is flipped down in an armrest use position 76, so that its weight bears down on storage tray 30 via roller 60. The closure device of armrest 70 is on its front side, which has a rounded engagement for the hand of a person. Objects 36 are placed in the two storage shells 34 in the two storage pockets 32a, 32b. Rod guide 52 is concealed behind a trim panel 82. Tension springs 57 are tensioned.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A storage system for a vehicle, the storage system comprising:
    a storage compartment;
    a housing that at least partially surrounds the storage compartment;
    at least one storage tray at least partially disposed in the storage compartment, the storage tray being slidable with respect to the housing along a linear path from a stowed position to an access position; and
    an armrest for opening and closing the housing,
    wherein the at least one storage tray and the armrest are each connected to the housing such that movement of the at least one storage tray from the stowed position to the access position occurs independent of a movement of the armrest from a closed position to an open position.

2. The storage system according to the claim 1, further comprising an unlocking device to lock and unlock the storage tray with respect to the housing.

3. The storage system according to the claim 1, further comprising a telescopic element for at least partially transporting the storage tray out of the storage compartment.

4. The storage system according to the claim 3, wherein the telescopic element includes a rod guide.

5. The storage system according to the claim 3, wherein a silicone brake is present for braking the velocity of the telescopic element.

6. The storage system according to the claim 1, wherein the storage tray has at least two storage pockets.

7. The storage system according to the claim 6, wherein the at least two storage pockets are disposed one above the other.

8. The storage system according to the claim 6, wherein the at least two storage pockets have one or a plurality of removable storage shells.

9. The storage system according to the claim 1, further comprising an unlocking device to lock and unlock the storage tray with respect to the housing, wherein the armrest is part of the unlocking device.

10. A storage system for a vehicle, the storage system comprising:
    a storage compartment;
    a housing that at least partially surrounds the storage compartment;
    at least one storage tray at least partially disposed in the storage compartment, the storage tray being slidable with respect to the housing; and
    an armrest for opening and closing the housing,
    wherein a roller transfers a weight of the armrest and compressive forces.

11. The storage system according to claim 1, wherein a roller transfers a weight of the armrest and compressive forces.

12. A storage system for a vehicle, the storage system comprising:
    a storage compartment;
    a housing that at least partially surrounds the storage compartment;
    at least one storage tray at least partially disposed in the storage compartment, the storage tray being slidable with respect to the housing along a linear path from a stowed position to an access position; and
    an unlocking device to lock and unlock the storage tray with respect to the housing,
    wherein the unlocking device includes a pushbutton and a hook, the pushbutton and the hook being provided on the storage tray, wherein the hook engages with a carriage mounted to the housing to lock the storage tray, and wherein the pushbutton, when depressed, disengages the hook from the carriage to unlock the storage tray.

13. The storage system according to claim 1, wherein the armrest is pivotably connected directly to the housing.

14. A storage system for a vehicle, the storage system comprising:

a storage compartment;

a housing that at least partially surrounds the storage compartment;

at least one storage tray at least partially disposed in the storage compartment, the storage tray being slidable with respect to the housing along a linear path from a stowed position to an access position; and an armrest for opening and closing the housing, wherein the storage tray has at least two storage pockets including a lower storage pocket and an upper storage pocket that is disposed above the lower storage pocket, wherein the armrest is movable between a closed position and an open position, wherein the upper storage pocket is accessible when the armrest is in the open position and the storage tray is in the access position, and when the armrest is in the open position and the storage tray is in the stowed position, and wherein the lower storage pocket is accessible when the armrest is in the open position and the storage tray is in the access position.

* * * * *